June 27, 1939.　　O. W. GITHENS ET AL　　2,164,061
CAMERA
Filed July 12, 1935　　5 Sheets-Sheet 1

INVENTORS
OTTO W. GITHENS
JESSE NORDEN &
BY　EDWARD G. MANNERBERG

ATTORNEY

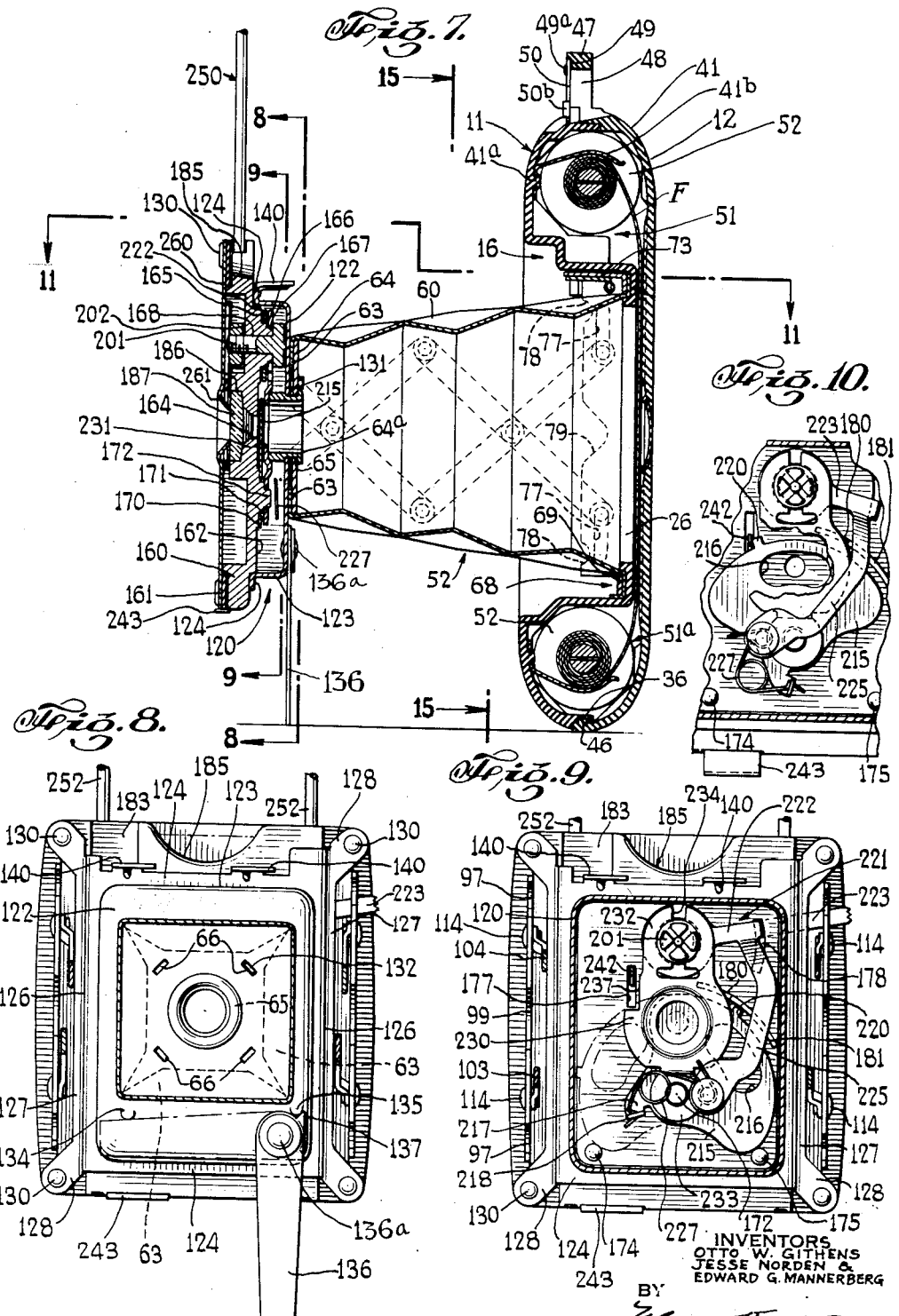

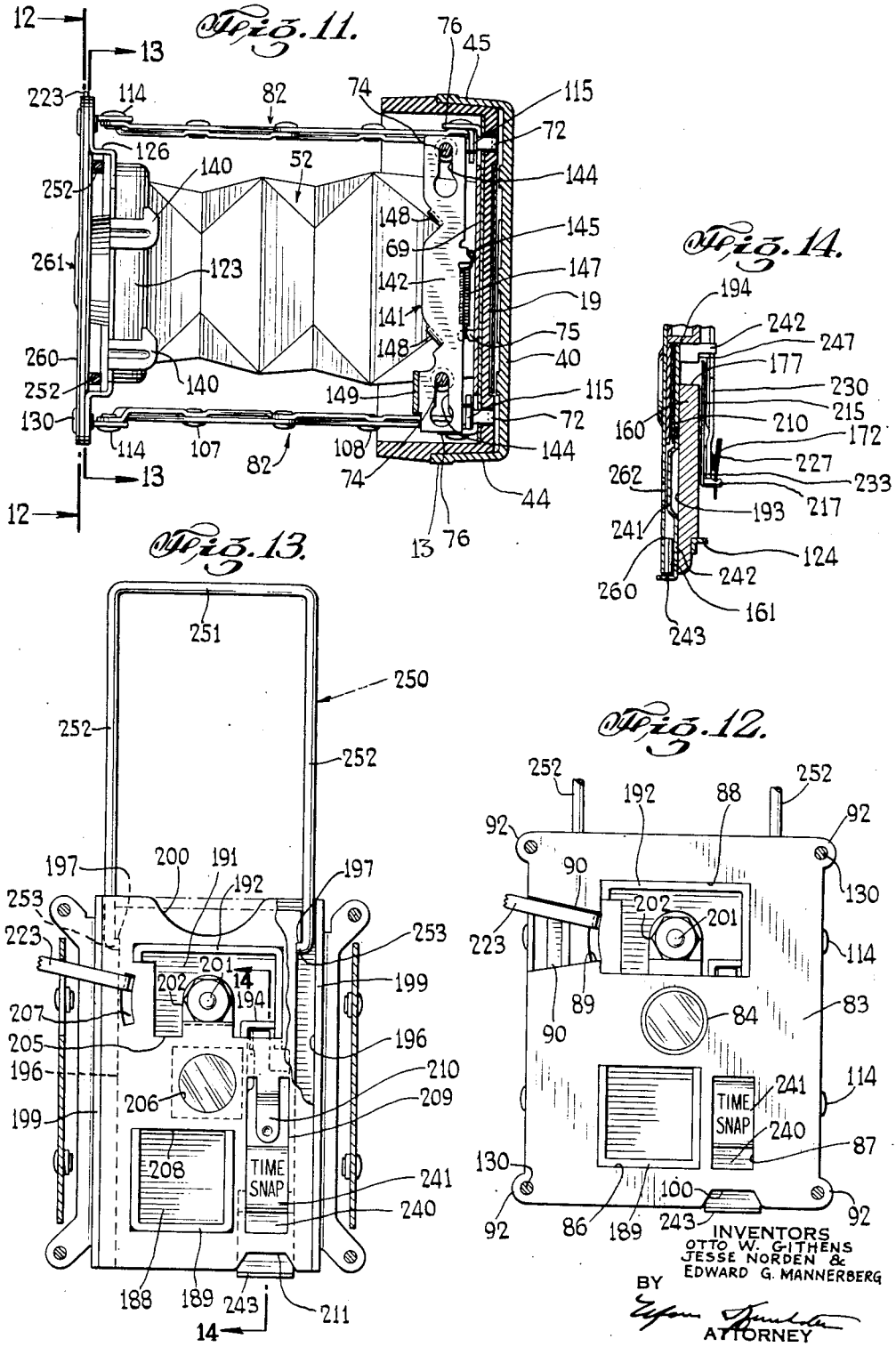

June 27, 1939.   O. W. GITHENS ET AL   2,164,061
CAMERA
Filed July 12, 1935   5 Sheets-Sheet 4
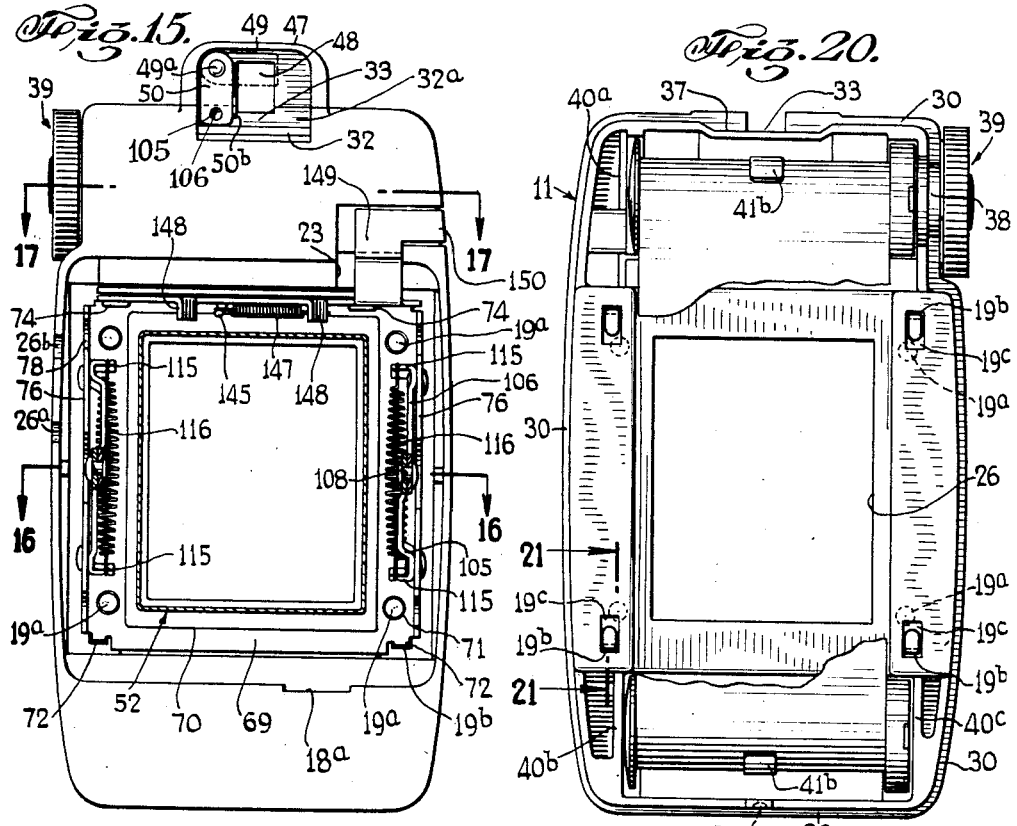
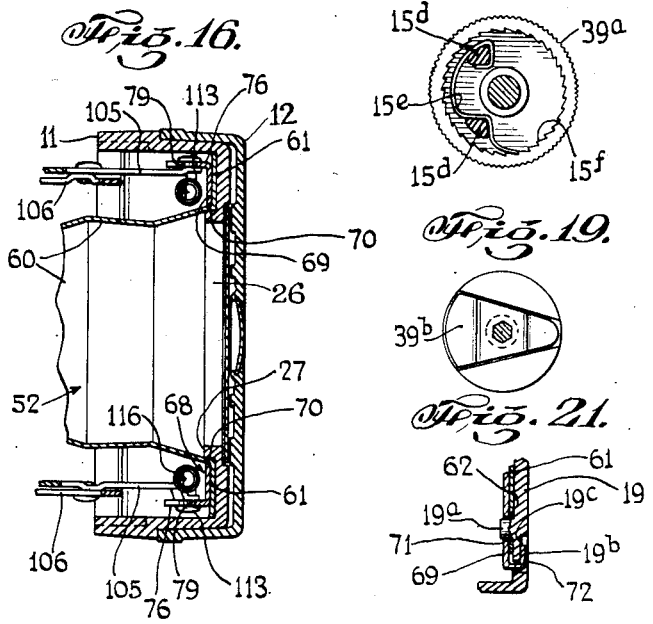
INVENTORS
OTTO W. GITHENS
JESSE NORDEN &
EDWARD G. MANNERBERG
BY
ATTORNEY

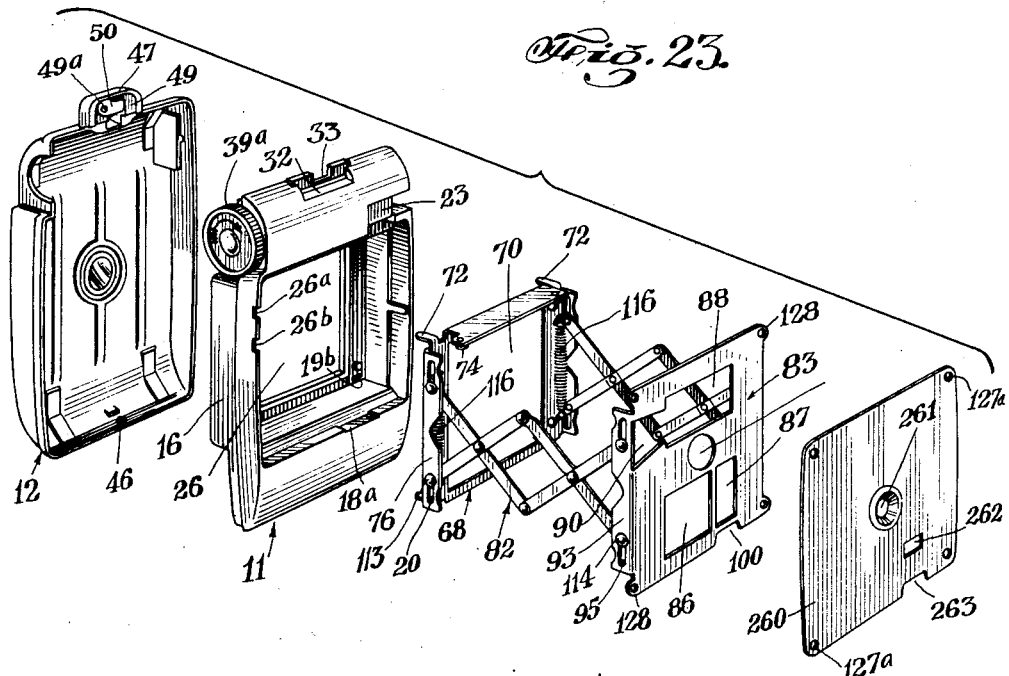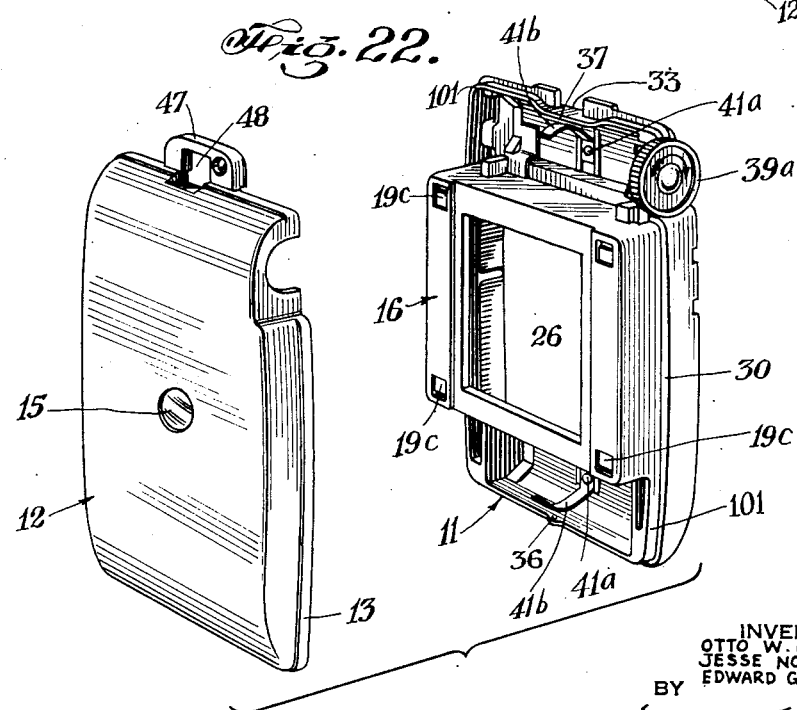

Patented June 27, 1939

2,164,061

UNITED STATES PATENT OFFICE 2,164,061

CAMERA

Otto W. Githens, New York, Jesse Norden, Astoria, and Edward G. Mannerberg, Brooklyn, N. Y., assignors, by mesne assignments, to Universal Camera Corporation, New York, N. Y., a corporation of Delaware Application July 12, 1935, Serial No. 30,962

12 Claims. (Cl. 95—32)

This invention relates to cameras, and more particularly to a folding camera of vest pocket size.

An object of this invention is to provide a camera of the character described, having a bellows light chamber, as well as a time exposure and snap shutter mechanism and which is also provided with means for supporting the camera on a flat surface when it is desired to take photographs by time exposure, the camera at the same time being of extremely compact construction and so designed that the various parts thereof may be easily assembled, thus enabling the camera to be manufactured at a relatively low cost.

A further object of this invention is to provide a compact camera of the character described, which shall be rugged in construction, easy to operate, and at the same time be thoroughly practical and efficient.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a front elevational view of the camera in closed or collapsed position;

Fig. 7 is an enlarged, cross-sectional view of the opened camera;

Fig. 8 is a cross-sectional view taken on line 8—8 of Fig. 7;

Fig. 9 is a cross-sectional view taken on line 9—9 of Fig. 7;

Fig. 10 is a front elevational, detail view of the shutter illustrating the time exposure;

Fig. 11 is a cross-sectional view taken on line 11—11 of Fig. 7;

Fig. 12 is a cross-sectional view taken on line 12—12 of Fig. 11;

Fig. 13 is a cross-sectional view taken on line 13—13 of Fig. 11;

Fig. 14 is a cross-sectional view taken on line 14—14 of Fig. 13;

Fig. 15 is a cross-sectional view taken on line 15—15 of Fig. 2;

Fig. 16 is a cross-sectional view taken on line 16—16 of Fig. 15;

Fig. 17 is a cross-sectional view taken on line 17—17 of Fig. 15;

Fig. 18 is a cross-sectional view taken on line 18—18 of Fig. 17;

Fig. 19 is a cross-sectional view taken on line 19—19 of Fig. 17;

Fig. 20 is an elevational, rear view of the back of the camera with the cover removed;

Fig. 21 is a cross-sectional view taken on line 21—21 of Fig. 20;

Fig. 22 is a perspective view illustrating the method of assembling certain of the parts of the camera; and Fig. 23 is a perspective view similar to Fig. 22.

Figure 1:
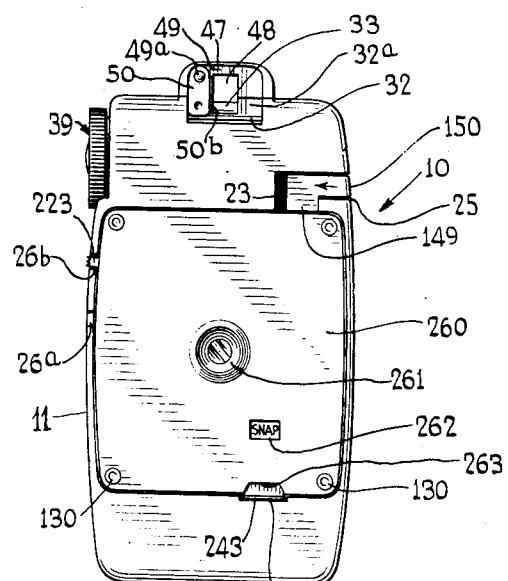

Referring now in detail to the drawings, there is disclosed in Figures 1 to 6 a camera 10 embodying the various features of the invention. The camera comprises a front housing 11 and a back cover 12, preferably made of cast metal and so designed as to fit into one another to form a compact camera casing of pleasing appearance. The means provided for locking housing 11 to cover 12 in assembled position will become apparent as the description proceeds. By referring to Figs. 7 and 22 it will be seen that housing 11 is provided with a central, box-like portion 16 projecting inwardly toward the inner wall of the back cover 12 leaving a space between said cover 12 and said portion 16 sufficient for a film F to pass freely therethrough. Projecting portion 16 is provided with an opening 26 which may be of a size corresponding to the photograph to be taken. In the drawings we have disclosed said opening to be rectangular in shape, and centrally located. Said box-like portion 16 is adapted to receive within it the camera lens and shutter mechanism mounted at one end of a lazy tong device associated with a metal bellows, and so designed that the aforesaid parts when compressed and folded are made to fit snugly into said portion 16. The outer surface of the said lens and shutter mechanism thus is made to maintain the symmetrical and pleasing outline of the camera, as shown in Figs. 1, 2, 4 and 6. A more detailed description of the above parts and how they are assembled will be made as the description proceeds.

The method and means for assembling and locking back cover 12 to housing 11 may be described as follows: Said cover 12 is provided at its lower end, and on the inside thereof, with a projecting lug 46 (Fig. 23) and at the top there is provided an upwardly projecting portion 47. It will be noted in Figs. 2, 3, 4 and 22 that said portion 47 also extends laterally beyond the inner wall of said cover 12. The reason for this will soon become apparent. Portion 47 is provided with an aperture 48 surrounded by a recessed area 49. Into this recessed area 49, such as at 49a, there is pivotally mounted a flat plate or locking member 50 of a thickness substantially equal to the depth of the depression of area 49. Said member 50 may be provided with a turned up edge portion 50b to facilitate movement about pivot 49a.

Figure 2:
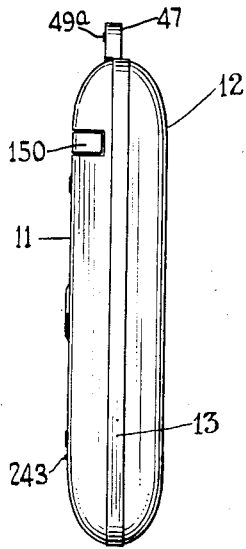
Fig. 2 is a side elevational view of the camera shown in Fig. 1.
Figure 4:
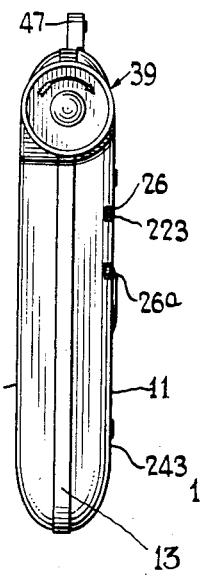
Fig. 4 is a view similar to Fig. 2 but showing the opposite side of the camera.
Figure 5:
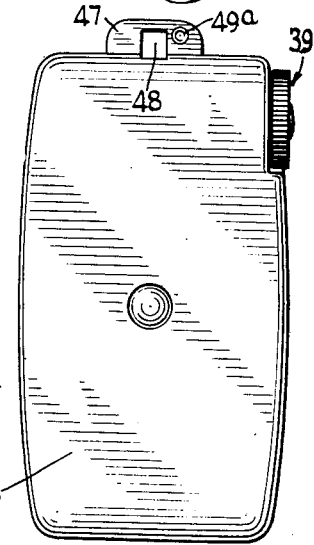
Fig. 5 is a rear elevational view of the camera shown in Fig. 1.
Figure 6:
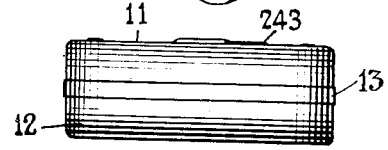
Fig. 6 is a bottom plan view of my improved camera.

As shown in Fig. 20 of the drawings, housing 11 is provided with a shoulder portion 30 of a width equal to the thickness of the walls of back cover 12 and having a ridge 101 extending upwardly from said shoulder 30 designed to guide and hold said cover 12 to form the sides of the camera casing, as shown in Figs. 2, 4 and 6. A slightly embossed portion 13 may be provided integral with cover 12 for improving the appearance of the camera. Within the ridge 101 there is provided a detent 36 (Fig. 22) adapted to engage the lug 46. At the top of said housing 11, the ridge 101 is depressed as at 37. The shoulder portion 30 is provided at the center of the depressed ridge 37 with a notch 33 of equal width with aperture 48 and in alignment therewith.

It is seen from the above description that in order to assemble front housing 11 and back cover 12, it is merely necessary to engage lug 46 of the cover 12 in detent 36 of housing 11 and fit said cover 12 over shoulder 30. When this is done it is found that notch 33 is in alignment to continue aperture 48 and that the recessed area 49 is flush with the shoulder portion 30 at the depressed ridge region 37, due to the depression 32 formed in the upper rear wall of housing 11, back of depressed ridge region 37 (Fig. 23). In order to lock the members in position it is necessary to turn the locking member 50 to a vertical position from its dotted line position, as shown in Figs. 1 and 15 to overlap housing 11 and cover 12. In order to hold the locking member in fixed position there is provided on the underside thereof a projection 105, adapted to engage a detent 106 in housing 11 at a point directly underneath said projection, as shown in Fig. 15. The aperture 48 may be utilized as a sight opening for the camera in cooperation with a finder hereinafter to be described. The cover 12 may be provided with an aperture 15 covered with a red transparent material to register with the film numbers and to align the same in proper position.

For extending the shutter and lens mechanism from its ineffective position, that is, within the box-like portion 16 of front housing 11, to effective position, such, for example, as shown in Fig. 7 of the drawings, there is employed a lazy tong device 82 (see also Fig. 3) held in extended position by means of a pair of coil tension springs 116 (acting so as to pull arms 105 and 106 of said lazy tong device 82 together. Said springs 116 may be designed to gradually increase in diameter from the outer ends toward the center thereof to better retain their resilient qualities under constant use.

Mounted adjacent the unpivoted ends of arms 105 and 106 is a rear frame 68. Said frame 68 is provided with turned-in side portions 76 having slots 20 (see Fig. 3) adapted to slidably engage pins 113 therein, said pins being fastened adjacent said arm ends. Frame 68 is provided with rearwardly extending tabs 72 (Fig. 23) adapted to be projected through corresponding slots 19b (see Figs. 21 and 23) in box-like portion 16 and folded over as shown in Fig. 20 to retain frame 68 in position. Recessed areas 19c adapted to accommodate the folded over portions of tabs 72 may be provided in order to maintain the same flush with the surface of the part box-like portion 16 that is adjacent the film. It will be noted that frame 68 is provided with an opening 70 corresponding to the opening 26 of housing 11.

Mounted adjacent the unpivoted ends of arms 103 and 104 is a front frame or plate 83, in a manner similar to the mounting of frame 68 to arms 105 and 106. Frame 83 is provided with turned-in side portions 93 having slots 95 adapted to slidably engage pins 114 therein, said pins 114 being fastened to and adjacent said arm ends. Frame 83 is in parallel relation to frame 68. It is seen from the above description that the extent of the outward movement of lazy tong device 82 is limited due to the size of the slots 20 and 95.

To reduce to a minimum the friction between the arms 103, 104, 105 and 106 of the lazy tong mechanism 82, said arms are provided with raised or offset portions adjacent their points of intersection (Fig. 11). Similarly, the ends of arms 105 and 106 cooperating with pins 113 and the ends of arms 103 and 104 cooperating with pins 114 are offset to reduce the friction between said arms and the front and rear frames 68 and 83.

Notches 78 and 97, and 79 and 99 are provided in the front and rear frames 68 and 83 to clear the heads of the rivets of the lazy tong device when in folded position.

Attached to front plate 83 on the inner side thereof is a housing or casing 120 adapted to receive the camera lens and shutter device as shown in Figs. 7 and 11 of the drawings, and which will later be described in detail. Casing 120 is provided with extending flanges 127 adapted to contact inner surface of the plate 83, and to register with apertured ears 128 of said plate 83. Casing 120 may be rigidly fixed to plate 83 for movement therewith by any suitable means, such as rivets 130. Positioned between the rear frame 68 and casing 120 is a collapsible bellows 52 adapted to furnish a sealed light path from the lens to the sensitized film. The bellows 52 may be of any suitable construction for the purpose, such as shown in the drawings and designed to decrease in cross-sectional area from back to front. The manner in which said bellows is attached to frame 68 and casing 120 may be described as follows.

The back portion of the bellows 52 is provided with outwardly folded flaps 61 adapted to overlie the inner surface of frame 68. The corner of said flaps 61 are cut away to clear the tabs 72. Said flaps 61 are provided with apertures 62 designed to register with corresponding apertures 71 in frame 68. Apertures 62 and 71 are designed to permit lugs 19a on the inner side of portion 16 to project therethrough to retain said bellows in position and to render it lightproof. To further protect said back end of the bellows against light leakage there is provided a flanged portion 27 (Fig. 15) surrounding the opening 26 in housing 11. When the back frame 68 carrying the flaps 61 is fitted into housing 11, opening 70 is fitted around said flange 27 which acts so as to fold the flaps 61 over flange 27 to form a light-proof seal.

The front end of the bellows 52 is provided with inwardly folded flaps 63 and attached to a plate 64 by any suitable attaching means, such as paste. For the purpose of centering said plate 64 with respect to casing 120, plate 64 is provided with slots 66 adapted to have projected therethrough a tab 132 attached to the rear wall of casing 120. For more efficient assembly, more than one slot 66 designed to receive tab 132 is provided to obviate the necessity for attaching said plate 64 to the front end of bellows 52 in any one position. Plate 64 may be attached to casing 120 by a bushing 64a having a flange extending through the openings 131 and 65 and swaged over the inner surface of the plate 64. To permit an uninterrupted light path from the opened lens to the film, casing 120 and plate 64 are provided with openings 131 and 65, respectively, said openings being of the same size and in alignment.

Overlying the front surface of the casing 120 and contacting therewith is a front plate 260 having apertures 127a registering with apertures in flanges 127 of casing 120 and riveted thereto by the rivets 130. Plate 260 is so designed as to fit neatly into the front open portion of housing 11, as shown in Fig. 1, and is provided with an aperture 261 adapted to cooperate with the lens 187 and to hold said lens in position (see Fig. 7).

Figure 3:
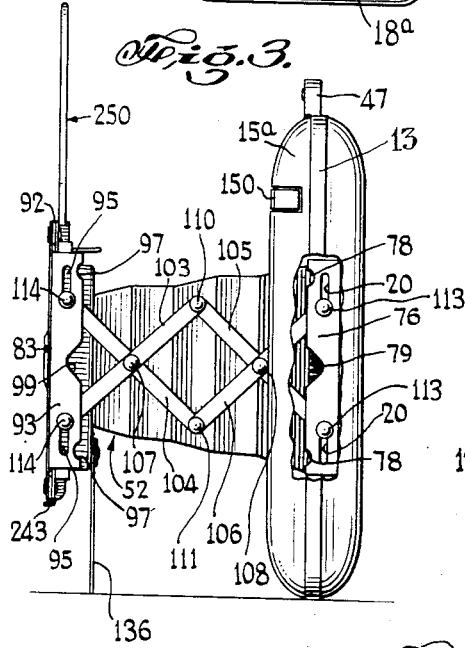
Fig. 3 is a side elevational view of the camera opened and standing up on a flat support, and with the finder in operative position.

From the description of the apparatus thus far it is seen that the springs 116 normally tend to project and maintain the front end of the camera in outward position, as shown in Fig. 3. When it is desired to fold the camera to an ineffective position, as shown in Figs. 2 and 4, it is merely necessary to press front plate 260 inwardly toward the camera casing to collapse bellows 52 and lazy tong device 82. To maintain the camera in said collapsed position, there is provided a novel catch mechanism which may be described as follows.

The upper end of shutter casing 120 is provided with two rearwardly extending horizontal cam members 140, as shown in Fig. 11 of the drawings. The underside of the top folded portion of rear frame 68 is provided with two headed pins 74. A catch member 141 adapted to contact said underside portion of frame 68 and to slide thereon is provided with slots 144 having one end thereof sufficiently enlarged to permit the heads of pins 74 to pass through and to be slidably engaged therein. A spring 147, one end of which is fastened to frame 68 at a point 75 the other end being attached to member 141 at 145, tends to normally maintain said member 141 in the position shown in Fig. 11. Member 141 is provided with cam portions 148 adapted to cooperate with cams 140. Thus it is seen that when the front end of the camera is pressed rearwardly to collapse or fold the same, cams 140 are caused to contact cam portions 148 to slide member 141 in a direction against the action of retaining spring 147 a predetermined distance until the hook portions of cams 140 engage the ends of cams 148 to hold the camera in collapsed condition against the action of springs 116.

When it is desired to project the front end of the camera for effective use, there is provided an angular extended portion 150 which may be integral with member 141 and adapted to extend to the outer surface of the camera housing 11 and rest in specially designed recessed area 23 in said housing (Figs. 1 and 15). Said portion 150 is adapted to be moved laterally in said recessed area 23. Thus it is seen that when said portion 150 is moved laterally in the direction of the arrow in Fig. 1, member 141 will be caused to move in the same direction against the action of spring 147 and after a predetermined distance of travel of said member 141, hooked cams 140 will be released from cams 148 to allow the front portion of the camera to be projected forwardly by the action of springs 116 as hereinbefore described.

Referring particularly to Figs. 7 to 13 of the drawings, there is disclosed the shutter mechanism housed in casing 120, comprising a plate 160 which may be of cast material, to the front wall of which is attached another plate 161 which may be of brass or any other suitable material. The plate 160 has an embossed or raised surface 162 on the rear side thereof projecting into shutter casing 120. Said plate is further provided with a centrally located lens aperture 164 adapted to register with apertures 131 and 65, in front end of bellows and plate 64, respectively. Above said opening 164, said plate 160 is provided on the rear surface thereof with a raised circular portion 165 from which extends a concentric cylindrical portion 166 provided with a pin 167. Said pin 167 has an aperture 168, below which there is provided a raised circular portion 170 having a concentric cylindrical projection 171 having a pin 172. The raised surface 162 is provided adjacent the bottom corners thereof, with spaced rearwardly projecting pins 174 and 175.

The plate 160 is further provided with an arcuate slot 178 registering with the inner end of cutaway portion 89 of plate 83 (Fig. 12). Plate 160 is also provided with a depressed area 183 (Fig. 9).

The rear surface of plate 160 is adapted to contact shoulder 124 of casing 120 around the raised surface 162, the upper and lower ends of said plate 160 being adapted to project beyond the upper and lower ends of said shoulder, as shown in Fig. 7 of the drawings.

Plate 160 is provided on the front surface thereof with a recess 186 concentric with aperture 164 and adapted to house a lens 187. Said plate 160 is further provided on the front surface thereof with a recessed area 188 and a ridge 189 at the sides and bottom of said recess. Said front surface also has a recess 191 (Fig. 13) communicating with arcuate slot 178 (Fig. 9) and bolt opening 168, and provided with a ridge 192 around a portion of the edge of said recess. Said front surface also has a vertical groove 193 extending to the bottom edge of plate 160, the upper end of said groove communicating with a slot 177 and having a top wall 194.

The brass plate 161 is adapted to contact the front surface of plate 160 and is received between the raised side edges 199 (Fig. 13). Said plate 161 is provided with a notch 200 at the top thereof corresponding to a notch 185 of plate 160. Said plate 161 may be attached to plate 160 by any suitable means such as a bolt 201 extending through opening 168 and engaging an apertured ear 202 on said plate 161. Said plate 161 is provided with an opening 205 registering with a portion of the recess 191 and is adapted to receive the lens aperture 164 of plate 160. Said plate 161 is also provided with an arcuate opening 207 adapted to register with arcuate opening 178 of plate 160. Said plate 161 also has an opening 208 receiving the ridge 189 of plate 160. The ridges 192 and 189 are constructed so as to project into openings 88 and 86 of plate 83 (Fig. 12) to assure perfect registration of the plates 160, 161 and 83. Said plate 161 is provided with a cutaway portion 209 aligned with groove 193 and with a spring tongue 210 projecting into said groove, for the purpose hereinafter explained.

Means are also provided cooperating with the shutter mechanism whereby the camera may be operated to take instantaneous or snapshot photographs as well as time exposures. For this purpose there is rotatably mounted on cylindrical projection 171 and contacting surface 170 a shutter plate 215 having an arcuate shutter opening 216. Said plate 215 is provided with an extension 217 having an angularly projecting notched finger 218. At the outer edge of plate 215 there is positioned a lug 220 disposed adjacent one end of the shutter opening.

Received on the other cylindrical projection 166 and adapted to contact raised surface 165 is a shutter operating member 221 having an arm 222 extending through arcuate slots 178 and 207, said arm 222 being provided with a portion 223 positioned in the cut away portion 89 of the plate 83. Upon oscillating said arm 222, the portion 223 is adapted to contact edges 90 which limit the oscillatory movement of said arm 222. Said portion 223 is constructed so as to project beyond plate 83, the outer end being corrugated to facilitate a gripping engagement by such means as a finger to operate the shutter. Said operating member 221 has a second arm 225 positioned at an angle to the first arm and terminating adjacent the extension 217 of the shutter plate 215 and connected to finger 218 by resilient means, such as a torsion spring 227.

Said arm 225 is adapted to contact the raised portion 181 of ridge 180 which serves as a guide for said arm. As the operating member 221 is moved the shutter plate 215 is caused to be oscillated thereby causing the shutter opening 216 to pass the lens opening at each oscillation to expose the film to the light rays passing through the lens. Pins 174 and 175 are provided as shown in Fig. 9 of the drawings, which serve as stops to limit the angular movement of shutter plate 215. The spring 227 insures a positive snap action as the end of arm 225 is made to move from one side to the other of the center of oscillation of the shutter plate 215.

To hold the shutter plate 215 and operating member in their planes of rotation, there is provided a bridging spring baffle 230 having a centrally positioned aperture 231 adapted to register with the lens aperture, and the oppositely extending ears 232 and 233. The ear 232 is slit vertically, as at 234, the inner edges formed by said slit being notched to receive pin 167. Ear 233 is provided with an opening adapted to receive pin 172. The baffle 230 may be fixed to shoulder 166 by the bolt 201 which engages ear 232. It will now be understood that the shutter plate and operative member are held on their pivot pins and in their planes of operation by means of the baffle spring 23b. To prevent the baffle from bending at its central portion, it is designed to contact the ridge 180. One side of the baffle is cut away, as at 237, to expose the slot 177.

Slidably mounted in groove 193, and received between the plates 160 and 161 is a slider 240 having an offset surface 241 (Fig. 14) extending into opening 209, and may have stamped or otherwise marked on said surface 241 the words "Time" and "Snap". The tongue 210 is adapted to press the slider 240 against plate 160 to be retained in any position to which it may be moved. Said slider 240 is provided with a finger 242 adapted to extend through slot 177. A forwardly projecting horizontal ledge 247 is also provided at the bottom end of said slider 240. When the slider is moved in an upward direction, the finger 242 will not be in the path of lug 220 of the shutter plate 215 and therefore the shutter will operate for the taking of snapshot exposures. When the slider 240 is moved downwardly the finger 243 will come into the path of the lug 220. Should the operating member then be moved, the shutter will be permitted to rotate only half the usual angle in order for the shutter opening 216 to register with the lens opening. Movement of the operating member in the opposite direction will cause the shutter plate to move back to its closing position. It is seen that when the slider 240 is moved to the "time" position, the shutter plate 215 will always be stopped in open position upon the oscillation of the operating mechanism therefor. Plate 161 is provided with a notch 211 aligned with the cut away portion 209 and adapted to register with the notch 100 of plate 83.

There is provided a finder 250 adapted to cooperate with the sight opening 48 to facilitate the proper framing of the photograph to be taken. Said finder 250 is mounted on the shutter mechanism and may be made of a single piece of wire U-shape in design, as shown in Fig. 13, and having its extending parallel arms 252 provided at the ends thereof with inwardly turned spurs 253. The arms 252 of the finder are adapted to be slidably received in grooves 196 of plate 160, said grooves being provided with internal shoulders 197 designed to cooperate with spurs 253 to limit the upward movement of said arms 252. Plate 161 when fastened to plate 160 serves to maintain arms 252 in grooves 196. To raise the finder 250 to effective position, as shown in Figs. 3 and 13, the tip of one's finger may be inserted in notches 185 and 200 and under top portion of said finder 250 and pull upwardly. The spurs 253 will contact the stops 197 to limit upward movement of the finder.

By referring to Figs. 1 to 5 of the drawings, it is readily seen how the sight opening 48 may be used in cooperation with the finder 250 to sight and frame the photograph.

The front plate 260 is provided with a window opening 262 through which either the word "Time" or "Snap" may be seen, depending upon the position of the slider 240. The front plate 260 is also provided with a notch 263 at the bottom edge thereof adapted to register with notches 100 and 211 in the plates 83 and 161 to permit the engaging of said slider to move the same.

When it is desired to put the camera in inoperative or closed position, as shown in Figs. 1 and 2, the housing 11 is provided with notches 26a or 26b adapted to receive the outer end of operating lever 223. Either one of the two notches 26a or 26b may be utilized, depending upon whether the lever 223 is up or down. Thus it is seen that by this construction the lever 223 cannot be operated when the camera is in collapsed position. The bottom end of the slider 240 is adapted to fit into the groove 18a at the front of housing 11.

As will be noted from the drawings, and more particularly, Figs. 7, 22 and 23, the design of the camera is such that when the cover 12 is assembled with the housing 11 there are formed above and below the box-like portion 16, film spool chambers 51 and 51a, adapted to house film spools 52 which may be similar to the spools shown in our copending application Ser. No. 659,912, filed March 7, 1933 for Photographic camera. Said spools may comprise a spindle having circular flanges at the ends, one of which is grooved to receive a key 39b of a winder 39. The film from the spool in the lower chamber 51a is adapted to unwind and pass upwardly between the rear wall of the box-like portion 16 and the inner wall of the cover 12 and to wind up on the spool 52 in the upper chamber 51. The spool 52 in the upper chamber 51a is adapted to be received between the walls 40b and 40c. The circular flanges of the spools contact portions of the spool chambers for rotatably supporting said spools. The knob 39a of the winding element is adapted to be received in the recess formed by the depressed portions of the housing 11 and cover 12 so as not to project beyond the side of the camera casing to prevent catching on the pocket when inserting or removing the camera, as well as to preserve the pleasing contours of the camera.

The spool winder comprises a stem extending through the aperture in ear 38, a knob or handle 39a fixed to said stem and provided with an annular flange, and a key 39b (Fig. 19) fixed to the inner end of the stem and adapted to engage film spool 52. There is provided a pair of outwardly extending lugs 15d supporting a spring 15e, one end of which is adapted to engage the ratchet teeth 15f on the inner surface of the knob flange 39a to permit rotation of said knob 39a in one direction only.

There is provided within the half chambers above and below the box-like portion 16, rearwardly extending integrally cast pins 41a on which are mounted strip springs 41b adapted to engage the film on the spools 52. The pins 41a are designed to extend through suitable openings in said springs, and the outer ends thereof are offset for fastening the inner ends of said springs to the front wall of housing 11.

When taking time exposure photographs, it is desirable that the camera be supported on some stationary support. For this purpose there is provided a supporting member 136 (Fig. 8) pivotally mounted to the rear wall of the casing 120, at 136a. As shown in Figs. 7 and 8, said member 136 is in effective position to support the camera. When it is desired to fold or collapse the camera, member 136 is rotated on pivot 136 to assume the dotted line position shown in the drawings and adapted to fold into the box-like portion 16 without interfering with said folding action. A pair of stops 134 and 135 are provided in the casing 120 to limit the movement of the member 136 to prevent the cutting of the bellows 52.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A camera comprising a casing having a separate front portion and a separate back portion, said front portion having an integral rearwardly extending box structure projecting into said back portion, means for detachably holding said front and back portions in assembled relationship, a bellows, a frame fixing the rear end of said bellows to said box structure, shutter mechanism attached to the front of said bellows, lazy tongs interconnecting said frame with said shutter mechanism and spring means to project said shutter mechanism.

2. A camera comprising a casing having a separate front portion and a separate back portion, said front portion having a rearwardly extending box structure projecting into said back portion, means for detachably holding said front and back portions in assembled relationship, a bellows, a frame fixing the rear end of said bellows to said box structure, shutter mechanism attached to the front of said bellows, lazy tongs interconnecting said frame with said shutter mechanism, spring means to project said shutter mechanism, said shutter mechanism being movable into said casing to collapse said bellows, and releasable means for retaining said bellows in collapsed condition.

3. A camera comprising a casing having a front portion and a rear portion interfitted therewith, said front portion having a recessed box provided with a rear wall having an opening and a plurality of slots, a bellows having at the rear thereof outwardly extending flaps contacting said rear wall, a rear frame having a wall pressing said flaps against said rear wall and tabs extending through said slots and bent over into engagement with said rear wall, said bellows having at the front thereof inwardly extending flaps adhered to a plate, a front frame, a housing attached to said front frame, said plate being attached to said housing, shutter mechanism between said front frame and housing, and lazy tongs interconnecting said front and rear frames.

4. A camera comprising a casing having a front portion and a rear portion interfitted therewith, said front portion having a recessed box provided with a rear wall having an opening and a plurality of slots, a bellows having at the rear thereof outwardly extending flaps contacting said rear wall, a rear frame having a wall pressing said flaps against said rear wall and tabs extending through said slots and bent over into engagement with said rear wall, said bellows having at the front thereof inwardly extending flaps adhered to a plate, a front frame, a housing attached to said front frame, said plate being attached to said housing, shutter mechanism between said front frame and housing, lazy tongs interconnecting said front and rear frames, hook means on said housing, and a spring catch on said rear frame adapted to releasably engage said hook means.

5. A folding camera comprising a casing, a bellows attached at the rear end thereof within said casing, a plate attached to the front end of said bellows, a frame attached to said casing by a lazy tongs, a housing attached to the rear of said frame, said plate being attached to the rear of said housing, a pair of superimposed contacting plates between said housing and frame, and a shutter and operating lever therefor on one of said pair of plates.

6. A camera comprising a casing having a pair of interfitted portions, one of said portions being provided with a projecting area beyond the other of said portions, and means for attaching said portions together comprising interengaging pin and socket means on said portions at one end of the casing at a point opposed to said projecting area, and a member pivotally mounted at one end thereof on said projecting area, said member having the free end thereof manually movable into engagement with the other of said portions.

7. A folding camera comprising a casing having a wall provided with an opening, a bellows having a rear end contacting the portions of said wall adjacent said opening, a rear frame attaching the rear end of said bellows to said wall, said frame having a pair of parallel walls provided with slots, a front frame attached to the front end of said bellows, and having a pair of parallel walls aligned with the first pair of parallel walls, and formed with slots, lazy tongs interconnecting said frames and including links having portions freely movable in said slots, and spring means tending to normally urge said lazy tongs to extended position.

8. A folding camera comprising a casing having a wall provided with an opening, a bellows having a rear end contacting the portions of said wall adjacent said opening, a rear frame attaching the rear end of said bellows to said wall, said frame having a pair of parallel walls provided with slots, a front frame attached to the front end of said bellows, and having a pair of parallel walls aligned with the first pair of parallel walls, and provided with slots, lazy tongs interconnecting said frames and including links having portions received in said slots, and spring means to project said lazy tongs, said spring means including a coil tension spring having an intermediate portion of increased diameter.

9. In a folding camera, a casing having a wall provided with an opening, and a plurality of lugs adjacent said opening, a bellows having outwardly extending flaps contacting portions of said wall adjacent said opening, and having openings adapted to receive said lugs, a frame having a portion receiving said bellows, holding said flaps against said wall, and having openings also adapted to receive said lugs, and means for attaching said frame to said wall.

10. A folding camera comprising a casing, a bellows attached at the rear to said casing, shutter mechanism attached to the front of said bellows, an operating lever forming part of said mechanism adapted to oscillate to two angular positions and having a projecting handle, said shutter mechanism being adapted to be received in said casing upon collapsing said bellows, and said casing having a pair of notches, one to receive said handle when said lever is in one angular position, and one to receive said handle when said lever is at its other angular position.

11. A folding camera comprising a casing having a wall provided with an opening, a bellows having a rear end contacting the portions of said wall adjacent said opening, a rear frame attaching the rear end of said bellows to said wall, said frame having a pair of parallel walls provided with slots, a front frame attached to the front end of said bellows, and having a pair of parallel walls aligned with the first pair of parallel walls, and formed with slots, lazy tongs interconnecting said frames and including links having portions freely movable in said slots, and springs interconnecting each pair of the two pairs of links which are disposed adjacent one of said frames.

12. A camera casing comprising a rear casing part and a front casing part having a box-like portion thereof extending within said rear casing part, a bellows attached at the rear end thereof to said front casing extending portion, said last named extending portion having a central opening and a plurality of slots arranged around said opening, an extensible shutter mechanism housing having a rear wall, an aperture in said rear wall in axial alignment with said central opening and a lug on said last named rear wall adapted to be received in one of said slots to attach said extensible housing to said front casing part.

OTTO W. GITHENS.
JESSE NORDEN.
EDWARD G. MANNERBERG.